Nov. 10, 1931.  G. P. WALKER  1,831,151
TEMPERATURE CONTROL SYSTEM FOR FREQUENCY DETERMINING ELEMENTS
Filed April 18, 1929   3 Sheets-Sheet 3
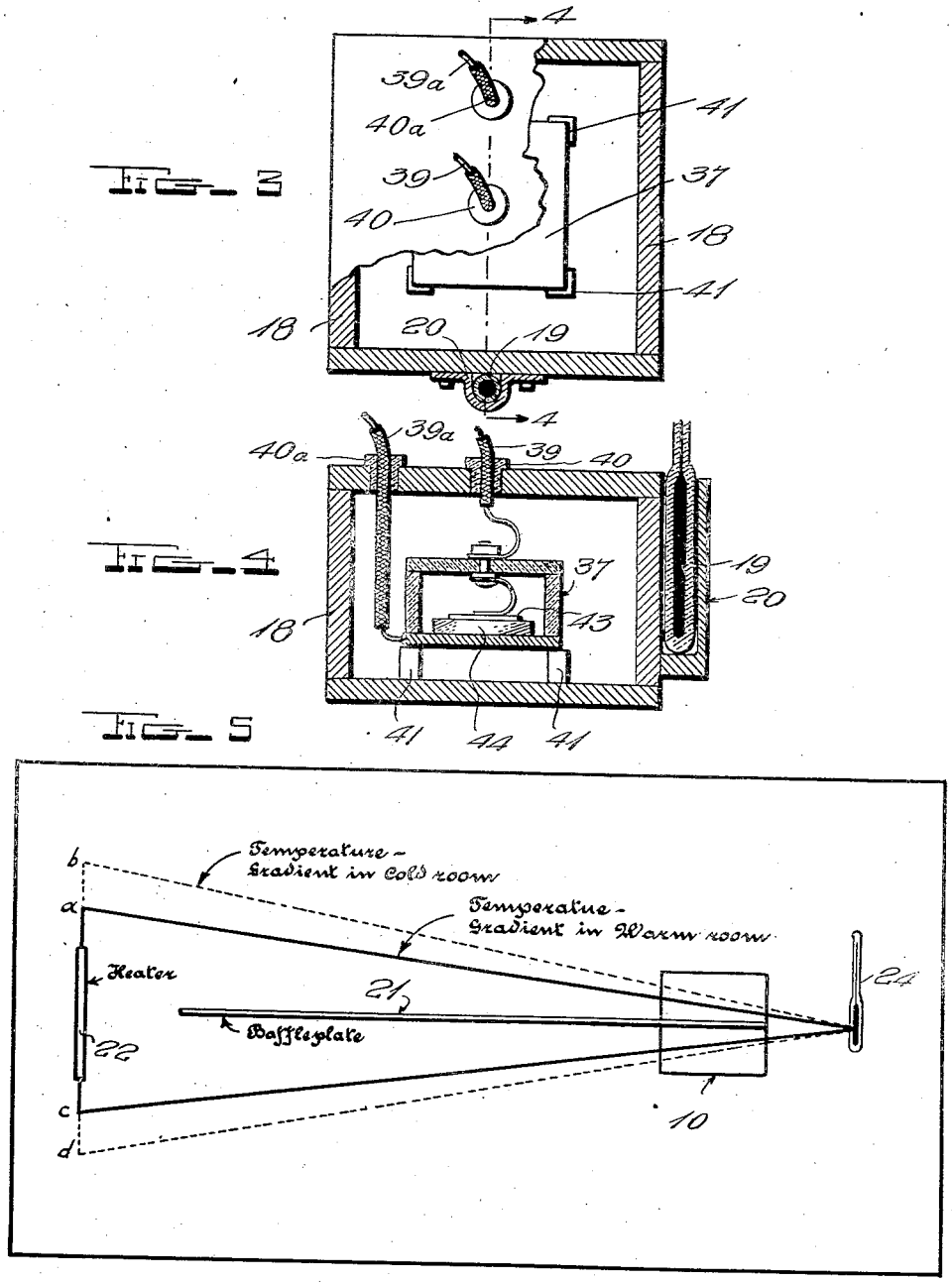
INVENTOR.
Guy P. Walker,
BY
Harold Dodd
ATTORNEY.

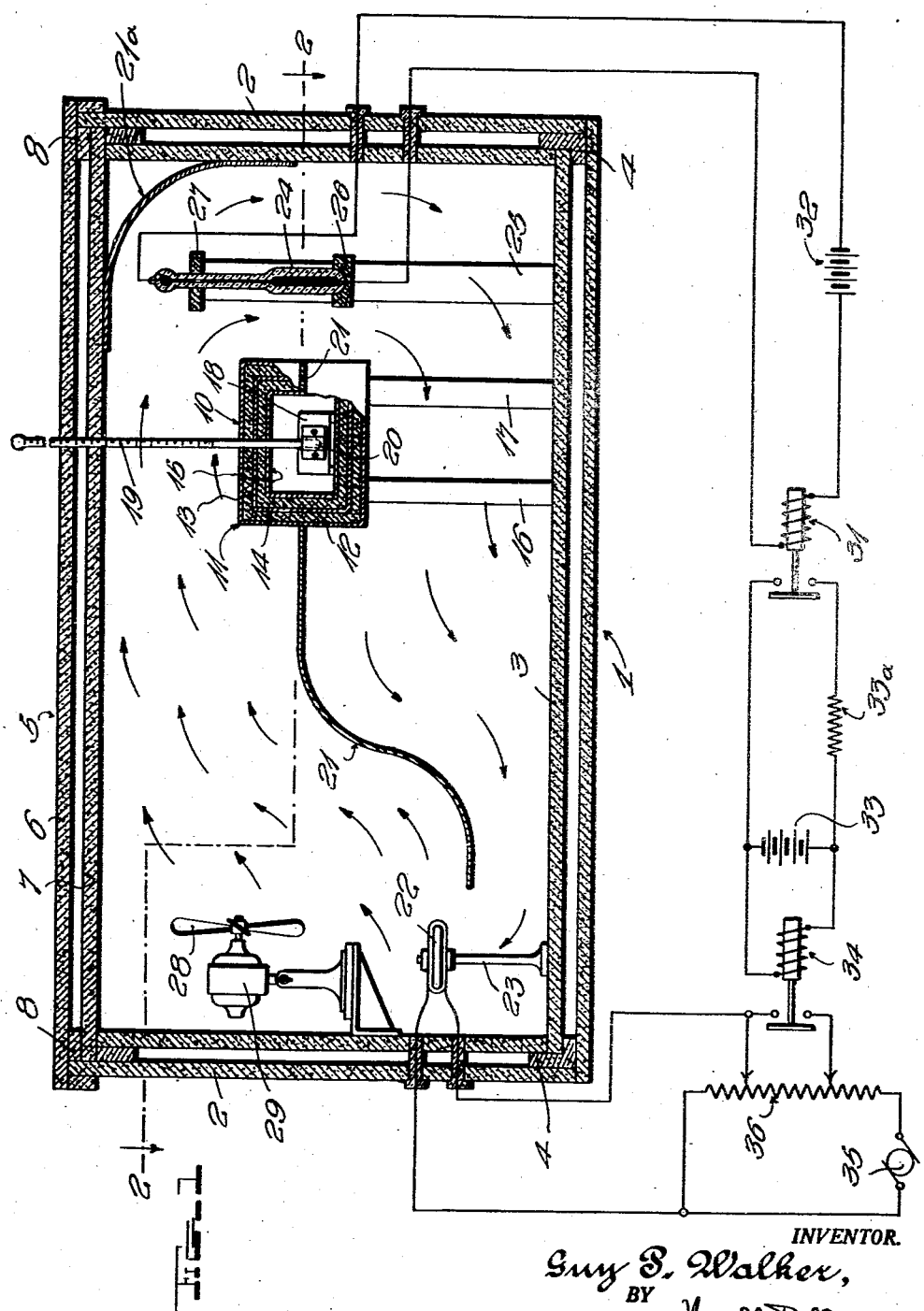

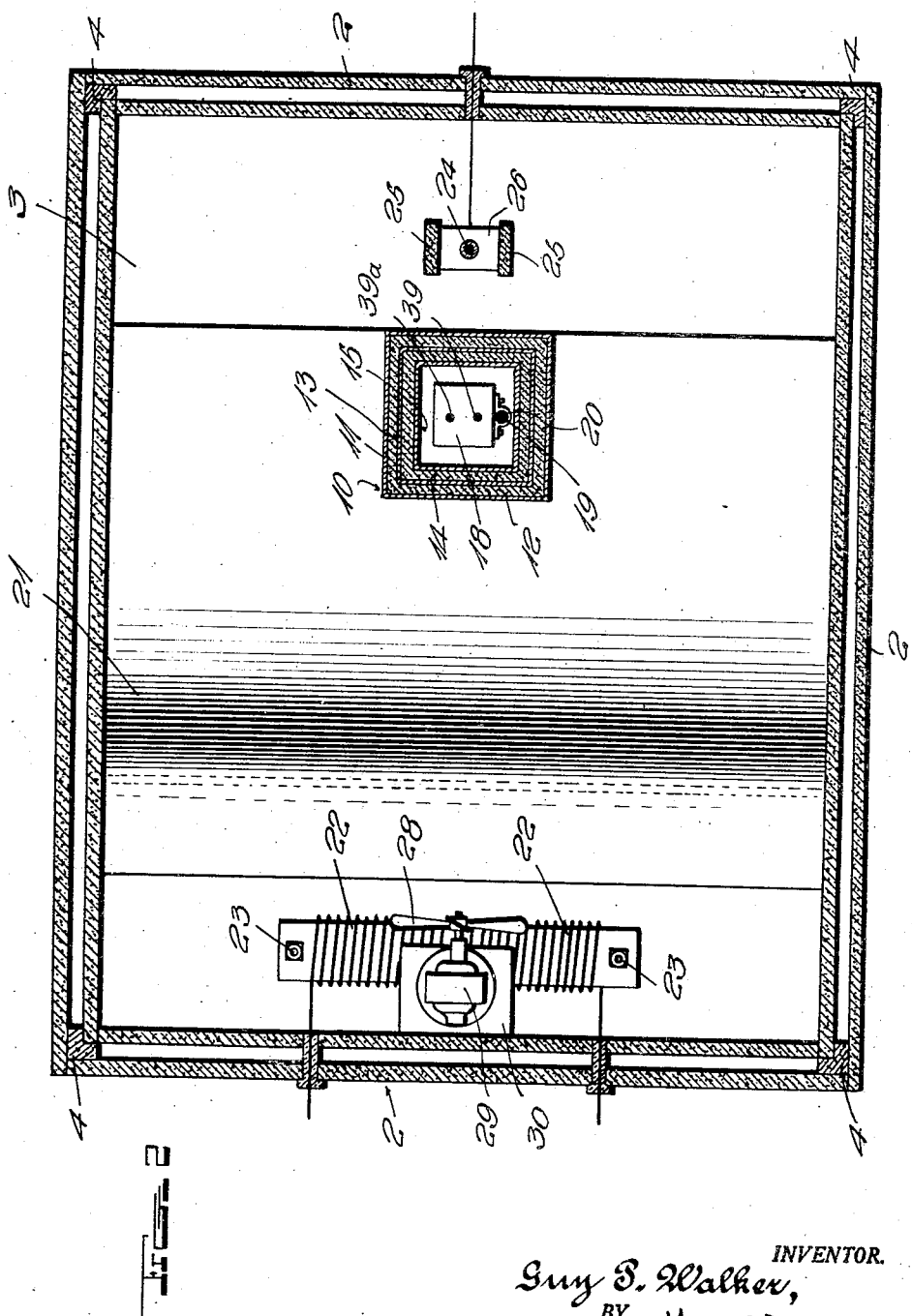

Patented Nov. 10, 1931

1,831,151

UNITED STATES PATENT OFFICE

GUY P. WALKER, OF WASHINGTON, DISTRICT OF COLUMBIA

TEMPERATURE CONTROL SYSTEM FOR FREQUENCY DETERMINING ELEMENTS

Application filed April 18, 1929. Serial No. 356,281.

My invention relates broadly to temperature control apparatus and more particularly to temperature control apparatus employed for maintaining the temperature of frequency control devices used in high frequency signaling systems at a substantially constant predetermined value.

One of the objects of my invention is to provide a housing for frequency controlling devices employed in high frequency systems wherein the frequency controlling devices may be maintained at substantially constant temperature.

Another object of my invention is to provide a housing for maintaining at substantially constant temperature frequency controlling devices employed at maximum power output in high frequency signaling systems.

Still another object of my invention is to provide a housing for electromechanical vibrators in which the electromechanical vibrator is so disposed with respect to the heated circulating medium in the housing that it will be maintained at a substantially uniform mean temperature throughout wide temperature variations.

A further object of my invention is to provide an arrangement for maintaining electromechanical vibrators at substantially constant temperature wherein the housing for the electromechanical vibrator is located adjacent a baffle plate member, which is maintained at a mean temperature, for exposing the electromechanical vibrator to the effects of the circulating medium passing on both sides of the baffle plate member.

A still further object of my invention is to provide an arrangement for maintaining the temperature of an electromechanical vibrator substantially constant wherein the electromechanical vibrator is positioned with respect to a heating unit in such a manner that it is practically unaffected by the rate of change of the temperature gradient of the medium external to the electromechanical vibrator.

Another object of my invention is to provide a container for keeping electromechanical vibrators at a substantially uniform temperature throughout large variations of ambient temperature, wherein a baffle plate is provided for guiding the circulation of the heating medium about the electromechanical vibrator so that different surfaces of the electromechanical vibrator casing are successively exposed to the heating effects of the circulating medium and the mean temperature of the circulating medium is caused to affect the electromechanical vibrator.

Other and further objects of my invention will be more fully understood from the following specification and the annexed claims.

According to my invention the temperature of electromechanical vibrators is maintined at a substantially constant value throughout large variations in climatic conditions by positioning an electromechanical vibrator in a container having walls made up of layers of heat insulating or heat retaining material of a cellular structure, and providing a baffle plate in the container so positioned adjacent the electromechanical vibrator device that the device is exposed during operation only to the effects of an optimum mean temperature. A heating unit is positioned within the container for heating the gaseous or liquid medium therein. The heating unit does not necessarily need to be positioned within the container but may be supported on the outside thereof or it may be supported in a compartment on a wall of the container. A fan, driven by an electric motor or similar driving means, is employed to agitate the gaseous or liquid medium inside of the container and cause the heated medium to come in contact with the objects inside of the container whereby equilization of the temperature of the objects is more readily obtained. The circulating medium is directed along one side of the baffle plate against first one portion of a housing surrounding the electromechanical vibrator and then in returning to the heating unit the medium is directed against the other portion of the housing. The baffle plate is positioned with an edge adjacent to the heating unit and with the edge extending along sides of the electromechanical vibrator housing. The baffle plate, being of a relatively good heat conducting material, such as copper or aluminum, is maintained at substantially equal temperature throughout its mass.

The temperature of the medium within the container decreases as it is caused to move farther and farther away from the heating unit. Likewise the temperature of the circulating medium continues to decrease as the medium is returning to the heating unit. It is one object of my invention to so dispose the electromechanical vibrator holder in the container, that the magnitude of the cooling of the circulating medium in the course of its traversing the distance from the heating unit to the electromechanical vibrator holder will be the same as the magnitude of the cooling of the circulating medium in its course from the electromechanical vibrator holder to the heating unit. The electromechanical vibrator and its holder is thus kept at a predetermined mean temperature irrespective of the changes in the temperature of large magnitude taking place on the exterior of the container.

Referring briefly to the drawings, Figure 1 illustrates the preferred embodiment of my invention; Fig. 2 illustrates a sectional view along the line 2—2 of Fig. 1; Fig. 3 is a detail view of the electromechanical vibrator housing; Fig. 4 is a cross-sectional view along the line 4—4 of Fig. 3; and Fig. 5 shows a series of curves illustrating the theory of operation of my invention.

In Fig. 1 of the drawings, reference numeral 1 designates a container having walls 2 and 3 of cellulose fiber composition or similar material having a cellular structure. Spacers 4 are employed between the walls 2 and 3 to support these walls in spaced relation in order to provide a dead air space between the walls. A cover 5 composed of walls 6 and 7 held together by spacer strips 8 which are disposed along the periphery of the wall 7, is provided on the container 1. A small casing 10 having walls 11, 13 and 15 of heat conducting material, such as copper or aluminum, and walls 12 and 14 of heat insulating material, such as, cellulose fiber composition or similar material having a cellular structure, alternately disposed between the walls 11, 13 and 15, is supported in the container 1 by members 16 and 17 which are also of heat insulating material. A box 18, having walls of copper or other highly heat conductive material, is mounted on small supports of heat insulating material within the casing 10. A thermometer 19 is supported against a surface of the box 18 by a socket member 20 which is attached to the box 18. A baffle plate 21 is supported within the container between the casing 10 and the heating unit 22. The baffle plate extends preferably on three sides of the casing 10 and is fitted directly against the exterior walls of the casing, as is illustrated in Fig. 2 of the drawings. The heating unit 22 is supported by the member 23 adjacent the end of the baffle plate 21 remote from the end adjacent the casing 10. A thermostat 24, preferably of the mercury expansion type, is supported by the members 25, 26 and 27, which are of heat insulating material, in a position such that the mercury body thereof is substantially one half above and one half below a continuation of the upper horizontal plane of the baffle plate 21. An auxiliary baffle plate 21a is employed to facilitate the circulation of the medium in the container. Baffle plates similar to 21a may be employed in all of the corners of the container. A fan 28, actuated by the motor 29, which is positioned on the shelf 30, is provided for agitating and maintaining in circulation the air or other medium within the container. Connections are provided between the heating unit 22 and the source of supply 35. A potentiometer 36 is connected between the heating unit 22 and the source of supply 35 so that the current flowing through the heating unit may be varied at will. A relay 34 which is connected to the source of supply 33, the resistance 33a and the contacts of relay 31, is controlled in operation by the thermostat 24. When the circuit is closed through the thermostat 24, through the action of heat transmitted from the heating unit 22, the relay 31 is energized by current from the source of supply 32 and the resistance 33a is connected across the winding of the relay 34. The current flowing through the relay 34 is decreased in value whereupon connections between the heater unit and the source 35 are rearranged and the current through heating unit is also decreased. The temperature within the container 1 is thus maintained substantially at a predetermined value through the control of the heating unit circuits by the thermostat.

In Fig. 3 a detail view of the box structure 18, which is positioned inside of the casing 10 is illustrated. A holder 37 for an electromechanical vibrator element is positioned within the box 18 upon supporting members 41 which are of insulating material. An electromechanical vibrator 44, such as a piezo electric crys al is positioned upon a preferably metallic base of the holder 37 and beneath the contact plate 43. Connections 39 and 39a are provided between the base of the holder 37 and the contact plate 43. Bushings 40 and 40a are provided in openings in a wall of the box 18 for the entrance of connections 39 and 39a.

The operation of the temperature control apparatus of my invention may be more readily understood from the curves illustrated in Fig. 5 of the drawings. In Fig. 5 the temperature gradient for conditions of operation encountered in a relatively warm room and those encountered in a relatively cold room are illustrated by the dotted and the solid curves. The relative positions of the casing 10, the thermostat 24, the heater 22 and the baffle plate 21 in the container 1 are shown the same as in Fig. 1.

Under conditions prevailing in a relatively cold room the mobile medium, such as the gaseous or liquid substance in the container 1 must be heated to a temperature corresponding to the point $b$ of the dotted curve of Fig. 5 in order that a certain predetermined temperature is obtained at the thermostat 24.

When the stystem of my invention is operated under conditions prevailing in a relatively warm room the mobile medium within the container 1 must be heated to a temperature corresponding to the point $a$ of the solid curve of Fig. 5 in order that the same predetermined temperature may be obtained at the thermostat 24 as was obtained under the conditions in the relatively cold room.

The temperature of the mobile medium in its movement from the thermosat to the heater, descreases to the values $c$ and $d$ under conditions of operation obtained in relatively warm and relatively cold rooms, respectively. It is therefore seen that by positioning the casing 10 in certain locations with respect to the baffle plate that the interior of the casing will be maintained at a predetermined mean temperature substantially equal to that of the thermostat since the variation in the temperature of the portions $e$ and $f$ of the casing 10, encountered in shifting from conditions prevailing in a warm room to those prevailing in a cold room will neutralize themselves and the same mean temperature will be obtained under the different conditions.

It is to be understood that while I have described my invention in certain of its preferred embodiments that I do not desire to be limited to those specific embodiments except as defined by the appended claims since my invention may be used equally well with various types of frequency controlling and stabilizing devices, such as tuning forks and magnetostriction devices, and is not necessarily confied to the temperature control of piezo electric crystal devices.

What I claim as new and desire to secure by Letters Patent of the United States is as follows:

1. In apparatus of the class described the combination of a container having walls of heat retaining material, a baffle plate positioned in said container for guiding the circulation of a mobile heat absorbing medium over a predetermined course within said container, means associated with said container for heating said mobile heat absorbing medium, and means for supporting an electromechanical vibrator adjacent to said baffle plate in such manner that said electromechanical vibrator is exposed to the effects of a plurality of currents of said medium simultaneously, each of said currents being of a different temperature.

2. In apparatus of the class described the combination of a container having walls of heat retaining material, means for heating a mobile medium within said container, a baffle plate positioned in said container for guiding the circulation of said heated mobile medium therein, means for supporting an electromechanical vibrator adjacent to said baffle plate for maintaining said electromechanical vibrator at substantially uniform temperature, and a thermostat positioned adjacent to said last mentioned means, said last mentioned means being exposed to a plurality of currents of said mobile medium simultaneously, said currents being of different temperatures.

3. In apparatus of the class described, the combination of a container having walls of heat retaining material, heating means associated with said container for heating a mobile medium in said container, a baffle plate located in said container, a thermostat positioned adjacent to one end of said baffle plate, said thermostat being connected with the energizing circuits of said heating means, a second container having alternate walls of heat retaining and heat conducting material, and means for supporting an electromechanical vibrator within said second container, said second container being adjacent to the edge of said baffle plate adjacent to said thermostat.

4. In apparatus of the class described the combination of a container, means within said container for heating a mobile medium therein, means operatively associated with said heating means for maintaining the temperature within said container substantially uniform, a baffle plate located within said container, and a second container of heat resisting material positioned within said first mentioned container and extending above and below said baffle plate whereby the interior of said second container will be maintained substantially at a predetermined mean temperature throughout wide temperature variations, and an electromechanical vibrator positioned within said second container.

5. In apparatus of the class described the combination of a container, means associated with said container for heating a mobile medium therein, a thermostat operatively connected with said means, means positioned in said container for accelerating the circulation of said mobile medium therein, a baffle plate positioned in said container for guiding the circulation of said medium, and supporting means for an electromechanical vibrator, said supporting means being exposed to the circulation of said mobile medium on both sides of said baffle plate simultaneously.

6. In apparatus of the class described the combination of a container having walls of fibrous heat retaining material, a heating unit positioned in said container, a thermostat operatively connected with said heating unit, a baffle plate located in said container for guiding the circulation of gaseous medium therein, and a second container for supporting an electromechanical vibrator, said second container being positioned in a notch in said baffle plate whereby the surfaces of said second container are exposed to the effects of said gaseous medium on both sides of said baffle plate.

GUY P. WALKER.